Jan. 17, 1956     G. W. BRODEN     2,730,810
TOOL BIT MICROMETER
Filed April 11, 1952
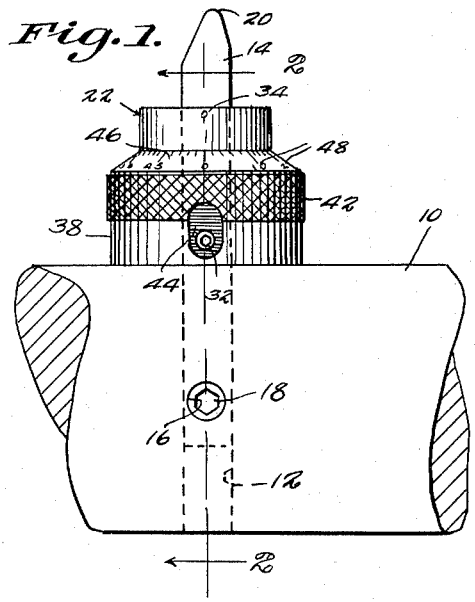
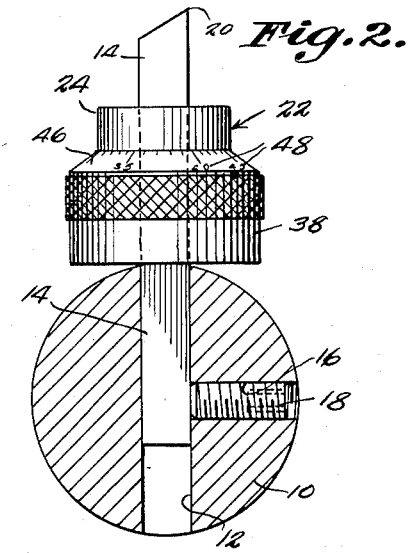
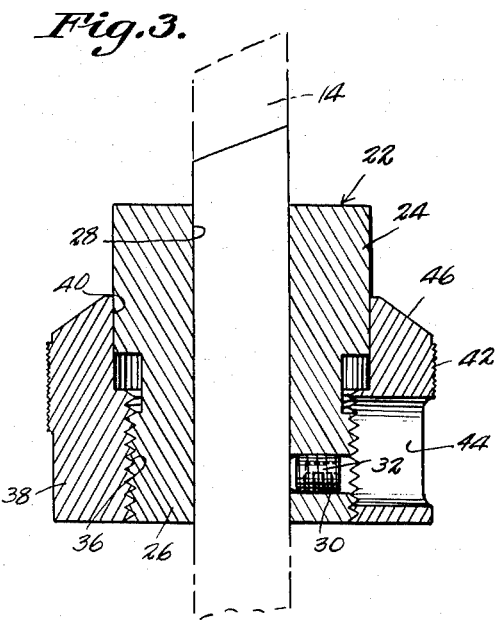
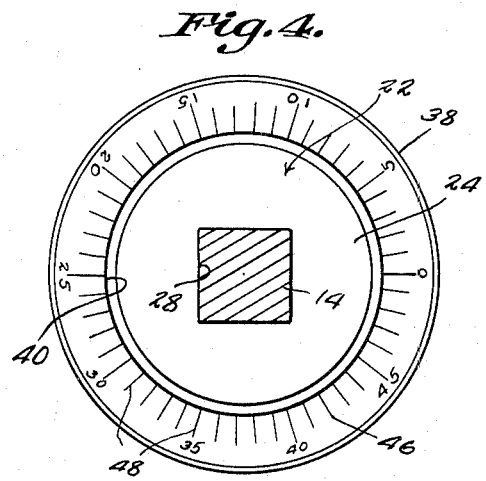
G. W. Broden
INVENTOR
BY *CASnow & Co.*
ATTORNEYS.

United States Patent Office 2,730,810
Patented Jan. 17, 1956

2,730,810
TOOL BIT MICROMETER

Gustaf W. Broden, Detroit, Mich.

Application April 11, 1952, Serial No. 281,869

2 Claims. (Cl. 33—185)

This invention relates to a tool bit micrometer and has for its primary object to accurately adjust a tool bit relative to a boring bar or the like.

In boring operations, it is customary to employ a boring bar in which a tool bit is mounted to project radially from the boring bar and then to take a rough cut by the tool bit in a piece of work so that the opening therein will roughly approximate the size of the bore to be made. After the rough cutting of the work, it becomes necessary to adjust the tool bit radially in the boring bar to produce an intermediate or finish cut in the work. In such boring operations accuracy is of great importance and the usual procedure involves the calipering of the bore made in the work and then adjusting the tool bit outwardly to produce a bore of the desired dimensions. The proper adjusting of the boring tool relative to the boring bar becomes a rather complicated procedure under ordinary circumstances and involves the use of a scale or height gauge and leaves considerable room for inaccuracies in the finished product.

Another object of this invention is to simplify the accurate outward adjustment of a boring tool relative to a boring bar and to effect economies in the time and labor involved in accurately adjusting the boring tool.

The above and other objects may be attained by employing this invention which embodies among its features an externally screw threaded collar having an axial tool bit receiving opening extending therethrough, means carried by the collar and engaging the tool bit for clamping the tool bit in the collar, and an internally screw threaded sleeve threadedly engaged with the threads on the collar for engaging a boring bar and moving the collar and tool bit radially with relation to the boring bar upon turning the sleeve relative to the collar.

Other features include affixing to the collar an index and providing on the sleeve cooperating indices by which the amount of radial movement of the tool bit relative to the boring bar may be accurately determined.

In the drawings,

Fig. 1 is a side view of a boring bar carrying a tool bit and illustrating the manner in which this improved adjusting means is employed, Fig. 2 is a vertical sectional view taken substantially on the line 2—2 of Fig. 1, Fig. 3 is an enlarged sectional view through the micrometer adjusting device, and Fig. 4 is a top plan view of the structure illustrated in Fig. 3.

Referring to the drawings in detail a boring bar 10 of conventional construction is provided with a conventional transversely extending opening 12 through which extends a conventional tool bit 14. In ordinary practice, the boring bar 12 is provided with a radial internally screw threaded opening 16 in which is threadedly engaged a set screw 18 by means of which the tool bit is secured in the boring bar to project laterally therefrom in perpendicular relation to the longitudinal axis thereof. The structure so far described is conventional and forms no part of this invention and as previously explained the accuracy of adjustment of the cutting lip 20 of the tool bit 14 presents considerable difficulty.

This invention embodies means by which the adjustment of the cutting lip 20 of the tool bit 14 may be readily achieved and comprises a collar designated generally 22. This collar 22 comprises an elongated substantially circular cylindrical body 24 carrying at one end an externally screw threaded extension 26 of slightly lesser diameter than the body 24. Extending longitudinally through the body 24 and extension 26 is an axial opening 28 which is preferably rectangular in cross section and receives the tool bit 14 as will be readily understood upon reference to the drawings. Formed in the screw threaded extension 26 and extending radially from the opening 28 through the periphery of said extension 26 is an internally screw threaded opening 30 for the reception of a set screw 32 which is adapted to be clamped against the tool bit 14 to temporarily secure the collar 22 on said tool bit. Carried by the periphery of the body 24 of the collar 22 is a suitable index 34, the purpose of which will become apparent.

Threadedly engaged with the external screw threads of the extension 26 are the internal screw threads 36 of a sleeve 38 which sleeve is provided adjacent its end opposite that carrying the threads 36 with a relatively large bore 40 in which the body 24 is accommodated. The sleeve 38 is provided with an externally knurled portion 42 to facilitate the turning of the sleeve relative to the body 24, and formed in the sleeve 38 adjacent the end thereof carrying the screw threads 36 and extending radially therethrough is a relatively large opening 44 through which access may be had to the screw 32. As illustrated, the upper surface of the sleeve 38, that is, the surface remote from the screw threads 36 is preferably inclined as at 46 and carries indices 48 which are adapted to cooperate with the index 34 in showing the relative position, preferably in thousandths of an inch of the sleeve 38 and collar 22.

In use assuming that a rough cut has already been produced in a piece of work by the tool bit 14 in the boring bar 10, and the rough cut of the bore has been calipered and found near the desired diameter of the bore, the collar 22 is slipped over the end of the tool bit 14 which projects from the boring bar 10 so that the sleeve 38 rests on the boring bar. The set screw 32 is then tightened against the tool bit 14 and the set screw 18 is loosened so that upon rotating the sleeve 38 about the collar 22, the tool bit may be moved radially with relation to the boring bar to the desired diameter according to the reading of the indices 48 relative to the index 34. When the desired adjustment has been completed, the set screw 18 is tightened to lock the tool bit in the boring bar and the set screw 32 is released to permit the collar 22 to be lifted from its position on the tool bit and the boring operation may then be resumed.

By the use of this device, it is obvious that a great deal of time and effort may be saved in adjusting a tool bit relative to its boring bar to produce the desired cut in the finished work.

While in the foregoing there has been shown and described the preferred embodiment of this invention it is to be understood that minor changes in the details of construction, combination and arrangement of parts may be resorted to without departing from the spirit and scope of the invention as claimed.

What is claimed is:

1. For use with a cylindrical boring bar having a convex outer surface and a tool receiving opening extending transversely thereof, a tool bit adjustably carried by said boring bar in the opening, a set screw carried by said boring bar and impinging said tool bit: means for accurately adjusting said tool bit when said set screw is initially loosened comprising an externally threaded collar having an axial tool bit receiving opening extending therethrough, another set screw carried by said collar transversely thereof engaging said tool bit for clamping the tool bit in the collar, and an internally screw threaded sleeve engaged with the threads on the collar, said sleeve engaging the surface of said boring bar and moving the collar and tool bit radially with relation to the boring bar upon turning of the sleeve relative to the collar, said set screw in said boring bar being again engaged with said tool bit, and said set screw in said collar being released from said tool bit to permit removal of said tool bit adjusting means from said boring bar and the accurately set tool bit.

2. The structure defined in claim 1 in which an index is carried by the collar and indices are carried by the sleeve for cooperating with the index on the collar to indicate the position of the tool bit relative to the boring bar.

References Cited in the file of this patent

UNITED STATES PATENTS

| | | |
|---|---|---|
| 2,330,692 | De Vlieg | Sept. 28, 1943 |
| 2,652,634 | De Vlieg | Sept. 22, 1953 |

OTHER REFERENCES

Publication: American Machinist, page 135, May 22, 1947. (Copy in Library.)